United States Patent [19]

Smith, Jr.

[11] Patent Number: 4,527,058
[45] Date of Patent: Jul. 2, 1985

[54] EARTH FORMATION DENSITY MEASUREMENT FROM NATURAL GAMMA RAY SPECTRAL LOGS

[75] Inventor: Harry D. Smith, Jr., Houston, Tex.

[73] Assignee: Halliburton Company, Duncan, Okla.

[21] Appl. No.: 418,330

[22] Filed: Sep. 15, 1982

[51] Int. Cl.³ .............................................. G01V 5/06
[52] U.S. Cl. ..................................... 250/256; 250/262
[58] Field of Search ................ 250/262, 256, 253, 261

[56] References Cited

U.S. PATENT DOCUMENTS

4,436,996  3/1984  Arnold et al. ...................... 250/256
4,439,676  3/1984  Smith, Jr. et al. .................. 250/256

Primary Examiner—Alfred E. Smith
Assistant Examiner—Carolyn E. Fields
Attorney, Agent, or Firm—William J. Beard

[57] ABSTRACT

Naturally occurring gamma radiations from earth formations in the vicinity of a well borehole are detected and spectrally separated into six energy regions or bands. Borehole compensation techniques are applied to the gamma ray spectra and the attenuation coefficient $\eta$ is determined as a result thereof. The attenuation coefficient is used along with predetermined borehole, casing and cement parameters to derive a measure of the density of the earth formations.

7 Claims, 6 Drawing Figures

EARTH FORMATION DENSITY MEASUREMENT FROM NATURAL GAMMA RAY SPECTRAL LOGS

FIELD OF THE INVENTION

The present invention is concerned with detecting the naturally occurring gamma radiation from the earth formations penetrated by a well borehole. More specifically, the invention concerns methods and apparatus for detecting gamma radiation and measuring the gamma ray count rate in defined energy ranges. The naturally emitted gamma rays enable determination of relative concentrations of potassium, uranium and thorium in the earth formations surrounding a well borehole. The penetration of the gamma ray photons is a function of earth formation matrix type. The gamma ray count rates in the selected energy windows may be isolated to define a factor expressive of formation matrix type. The penetration of the gamma ray photons is also a function of the density of the earth formations. Proper analysis of the natural gamma ray energy spectrum may, under certain conditions, also be used to determine formation density.

BACKGROUND OF THE INVENTION

Naturally occurring gamma radiation for K-U-T (potassium, uranium and thorium) elements yields gamma ray intensity vs. energy spectra in the vicinity of a well borehole observed by highly stable scintillation detectors in the well borehole. The radiation at the scintillation detector and its associated photomultiplier produces a pulse height spectrum proportional to the energy of gamma rays impinging on the scintillation crystal. The spectrum is divided into selected energy ranges or windows. Three windows are centered about selected gamma ray emission peaks for the naturally occurring gamma rays of the K-U-T elements. Gamma ray count rates in each of the three energy ranges are transmitted to the surface and processed by a technique known as spectrum stripping wherein standard calibration spectra, for each of the individual elements (obtained in standard boreholes) are applied to the unprocessed data (count rates) of the selected windows (energy ranges) to detect each of the three elements of interest. The "stripping constants" are derived from measurements of the standard gamma ray energy spectra in standard boreholes containing essentially only one of the three elements to enable the stripping constants to be applied to the measured spectrum in an unknown earth formation surrounding a borehole. The concentration of the three elements of interest is determined after application of the stripping constants. After carrying out specified procedures, relative elemental concentrations of the K-U-T elements are obtained. Formation density may be derived from the borehole compensated count rates as well.

The actual gamma ray count rate achieved at a scintillation detector in a well borehole is dependent on the Compton attenuation coefficient $\eta$. Each photon has a point of origination somewhere in the adjacent earth formations in traveling toward the scintillation detector. The attenuation of the gamma ray photon flux along the path of travel is dependent on the thickness of the material, the density of the material and the formation matrix type of the material. The gamma ray photons travel along a path having a length which is statistically determined from the distributed emission sources, namely the K-U-T elements. The present invention provides a measurement of formation density of an adjacent formation by utilization of the measured natural gamma ray spectrum observed at a scintillation crystal coupled with signal processing procedures as described below.

Major attenuation factors of the gamma ray flux include pair production, Compton scattering, and photoelectric absorption. Below certain energy levels, pair production is negligible and, therefore, not significantly involved in the method described herein.

BRIEF SUMMARY OF THE INVENTION

The observed or measured gamma ray energy spectra are thus separated into six energy level windows. The location of the six energy windows in the observed gamma ray spectrum is important. There are three known energy peaks for the K-U-T elements, and windows are normally defined to observe the peaks. The K-U-T peaks are 1.46, 1.76 and 2.61 MeV gamma radiation peaks for potassium ($K^{40}$), uranium ($Bi^{214}$) and thorium ($Tl^{208}$). A fourth energy window is defined in the Compton dominated spectrum to compensate for borehole and formation density induced changes in the calculated K-U-T concentrations. The fifth window (which may or may not overlap the fourth window) is sufficiently high in energy range to be above the effects of photoelectric absorption so that the primary mode of photon attenuation is Compton scattering. The sixth window is defined at very low gamma ray energy levels where photoelectric absorption is of major importance and relative attenuation due to pair production or the Compton effect is minimized.

The measured count rates in the fifth and sixth windows can be used to define a ratio which, after isolation of K-U-T elemental concentration effects, is primarily a function of the formation photoelectric absorption cross-section $\mu$, and the borehole parameters adjacent to the tool. The Compton attenuation parameter $\eta$ is sensitive to formation density, and hence can be used to indicate porosity.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE INVENTION

The present invention is concerned with formation density measurements. Before formation density determination is discussed, certain preliminary measurements must be described. The preliminary measurements of a naturally occurring gamma ray spectrum defined in selected energy windows are made and elemental concentrations are determined. Gamma ray attenuation due to Compton scattering is determined and density is obtained.

Logs of natural gamma ray activity in three energy ranges have been used to estimate the potassium (K), uranium (U) and thorium (Th) content of earth formations. These logs (commonly referred to K-U-T logs) were initially used to determine other important information about the earth formations penetrated by a well borehole such as:

(1) the oxidation state of the bed at the time of deposition;
(2) quantity of organic material in sedimentary layers which (together with Item 1) leads to source rock bed identification;
(3) the depositional environment of the bed (i.e. continental vs. marine deposition);
(4) water movement in downhole formations which, in turn, may indicate fractures, faulting or permeability;
(5) water movement in the borehole region which may indicate channeling or water producing perforations;
(6) more accurate shale content determinations for a particular bed and;
(7) clay typing and marker bed identification.

The two commercially available services, responsive to naturally occurring gamma radiation, each use scintillation type gamma ray detectors which are biased to record the gamma radiation in either three or five energy bands or windows. Count rate contributions from the decay of each of the elements of interest, or their daughter decay products are mathematically stripped or fitted from the composite count rate observed within the three or five energy windows. Elemental concentrations may then be computed from the stripped or fitted count rates. In the second type of commercial logging operation for this purpose currently available, the use of five energy windows provides an overdetermined set of relations which may be used to statistically enhance the count rate information from each of the energy windows. Elemental concentrations may then be computed from the stripped or fitted count rates. However, no basic change from a comparison of unknown spectra with standard gamma ray spectra taken under standard borehole conditions is contemplated in either of the commercially available techniques at present. The method of the present invention uses multiple (6) windows for entirely different reasons. This method is passive, that is, lacking in a gamma ray source as exemplified in the publication "the Lithodensity Log," SPWLA. 1979 European Symposium by F. Felder & C. Boyeldieu.

Changes in borehole conditions can introduce errors in concentration calculations of the elements that can approach an order of magnitude. Such errors, although large, were tolerable in early applications of the K-U-T log for minerals exploration. However, as the applications of such logs become more sophisticated, errors of this magnitude became unacceptable.

In the present invention, a K-U-T log enhanced with borehole compensation by utilizing the response measured in a fourth energy window. Fifth and sixth energy windows are used in formation matrix type determination. The fourth, or compensation, window monitors the shape of the gamma ray spectrum caused by variations in borehole conditions. The response of the compensation window is then used to correct the response of the count rate in the first three energy windows to some standard borehole and formation geometry. The fifth window measured count rate is used with the sixth window count rate to determine formation matrix type or lithology.

Figure 1:
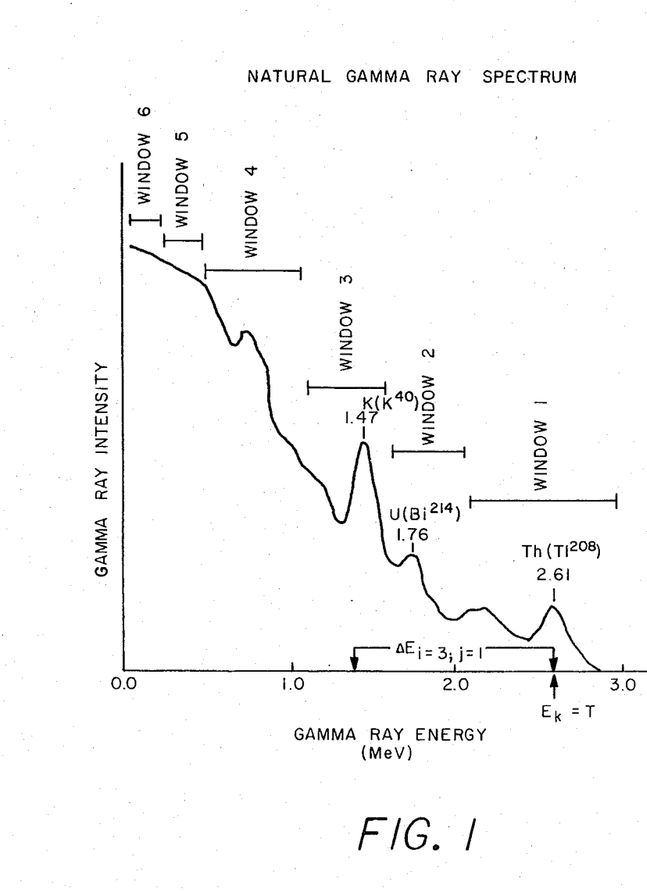
FIG. 1 is a graphical representation illustrating a typical natural gamma ray energy spectrum in a borehole taken with a scintillation detector and showing six approximate energy ranges or "windows" used in the present invention.

Referring now to FIG. 1, a natural gamma ray spectrum is illustrated schematically in which the gamma ray intensity or count rate is plotted as a function of gamma ray energy over the energy range from 0–3 MeV. Six energy windows contemplated for use, according to the present invention, are illustrated superimposed on the gamma ray spectrum of FIG. 1. The fifth and sixth windows will be defined in more detail later. The energy bands or windows labelled window 1, window 2 and window 3 are chosen to include the 2.61, 1.76 and 1.46 MeV gamma radiations from the decay of thorium ($Tl^{208}$), uranium ($Bi^{214}$), and potassium ($K^{40}$). The total count rate recorded in each window may be expressed as given in Equations (1)–(4).

$$C_1 = C_{1,T} \tag{1}$$

$$C_2 = C_{2,U} + K_{2,1,T} C_{1,T} \tag{2}$$

$$C_3 = C_{3,K} + K_{3,1,T} C_{1,T} + K_{3,2,U} C_{2,U} \tag{3}$$

$$C_4 = K_{4,3,K} C_{3,K} + K_{4,2,U} C_{2,U} + K_{4,1,T} C_{1,T} \tag{4}$$

where Equations (1)–(4):
$C_j$ = the count rate measured in window j j—1, ---, 5;
$C_{j,k}$ = the count rate contribution in window j due only to activity from the element k(K-T,U,K);
$K_{i,j,k}$ = "stripping" constants defined as:

$$K_{i,j,k} = C_{i,k}/C_{j,k} \tag{5}$$

The constants $K_{i,j,k}$ are measured in "standard" borehole conditions surrounded by formations, each of which contains only K, only U, or only Th. The constants $K_{i,j,k}$ are, therefore, known calibration constants.

For standard borehole conditions, equations (1), (2), and (3) are solved for $C_{1,T}$, $C_{2,U}$, $C_{3,K}$ by $$C_{1,T} = C_1 \tag{6}$$

$$C_{2,U} = C_2 - (K_{2,1,T} C_1) \tag{7}$$

$$C_{3,K} = C_3 - (K_{3,2,T} C_1) - K_{3,2,U}(C_2 - K_{2,1,T} C_1) \tag{8}$$

where all terms on the right hand side of equations (6), (7) and (8) are either measured quantities ($C_1$, $C_2$, $C_3$) or the several known calibration constants ($K_{i,j,k}$). The relationship between $C_{j,k}$ and the corresponding elemental concentrations $M_k$, $M_u$ and $M_T$ will be discussed later.

In non-standard borehole conditions, the stripping constants $K_{i,j,k}$ measured in "standard" borehole conditions do not hold true if there is deviation from the standard configuration. Examples of stripping constants are shown in Table I for a selected group of Compton dominated energy ranges, with the "nonstandard" stripping constants, calculated using Monte Carlo techniques, being denoted by primes:

Tool Diameter: 3⅜" (centralized)
Standard Borehole: 10" F.W. (fresh water) Filled (with 38% porosity oil sand formation).
Non-standard Borehole: 10", 5½" F.W.CSG (casing)+CMT (cement) (with 38% porosity oil sand formation).

TABLE 1

| Win- | | Stripping Constants | |
|---|---|---|---|
| dow # | Energy Range | Standard $K_{i,j,k}$ | Nonstandard $K'_{i,j,k}$ |
| 1 | 2.0–3.0 MeV | | |
| 2 | 1.6–2.0 MeV | $K_{2,1,T} = 0.118$ | $K'_{2,1,T} = 0.130$ |
| 3 | 1.1–1.6 MeV | $K_{3,1,T} = 0.157$ | $K'_{3,1,T} = 0.235$ |
| 4 | 0.5–1.1 MeV | $K_{4,1,T} = 0.357$ | $K'_{4,1,T} = 0.529$ |
| 5 | .15–0.5 MeV | $K_{3,2,U} = 0.406$ | $K'_{3,2,U} = 0.388$ |
| | | $K_{4,2,U} = 0.647$ | $K'_{4,2,U} = 0.951$ |
| | | $K_{4,3,K} = 0.657$ | $K'_{4,3,K} = 0.955$ |
| | | $K_{5,1,T} = 0.864$ | $K'_{5,1,T} = 1.029$ |
| | | $K_{5,2,U} = 1.647$ | $K'_{5,2,U} = 1.650$ |

CORRECTION OF STRIPPING CONSTANTS FOR NON-STANDARD BOREHOLE CONDITIONS USING THE RESPONSE OF THE FOURTH WINDOW COUNT C4

There are three major parameters which affect the stripping constants as borehole and, to a lesser extent, formation conditions change. They are given by:

(a) $\eta \equiv \Sigma_s \rho_s x_s$ where $\rho_s$ and $x_s$ are the densities and effective thickness, respectively, of each intervening material s such as borehole fluid, casing, and rock matrix between the detector within the sonde and the source of radiation;

(b) $E_k \equiv$ the primary gamma ray energy from element k (see FIG. 1);

(c) $\Delta E_{i,j} \equiv$ the difference in the midpoint of energy window j and energy window i (see FIG. 1).

The stripping constants $K_{i,j,k}$ obtained from a standard borehole at standard conditions must be corrected with functions of $\eta$, $E_k$ and $\Delta E_{i,j}$ to obtain correct stripped count rates $C_{1,T}$ and $C_{2,U}$, and $C_{3,K}$ in non-standard boreholes. This operation can be expressed mathematically by rewriting Equations (1), (2) and (3).

$$C_{1,T} = C_1 \tag{9}$$

$$C_{2,U} = C_2 - [L(\eta)G_{2,1,T}(E_T,\Delta E_{2,1})]K_{2,1,T}C_1 \tag{10}$$

$$C_{3,K} = C_3 - [L(\eta)G_{3,1,T}(E_T,\Delta E_{3,1})]K_{3,1,T}C_1 - \\ ([L(\eta)G_{3,2,U}(E_U,\Delta E_{3,2})]K_{3,2,U}(C_2 - \\ [L(\eta)G_{2,1,T}(E_T,\Delta E_{2,1})]K_{2,1,T}C_1)) \tag{11}$$

Again, the terms $C_1$, $C_2$, and $C_3$ are measured values while the constants $K_{i,j,k}$ are known calibration constants measured under standard borehole conditions. From Equations (9), (10) and (11), the problem is to determine the unknown or remaining stripping function correction term $L(\eta)$ and $G_{i,j,k}(E_k, \Delta E_{i,j})$ where i, j, and k denote the same quantities as those used with the stripping constants $K_{i,j,k}$.

Figure 2:
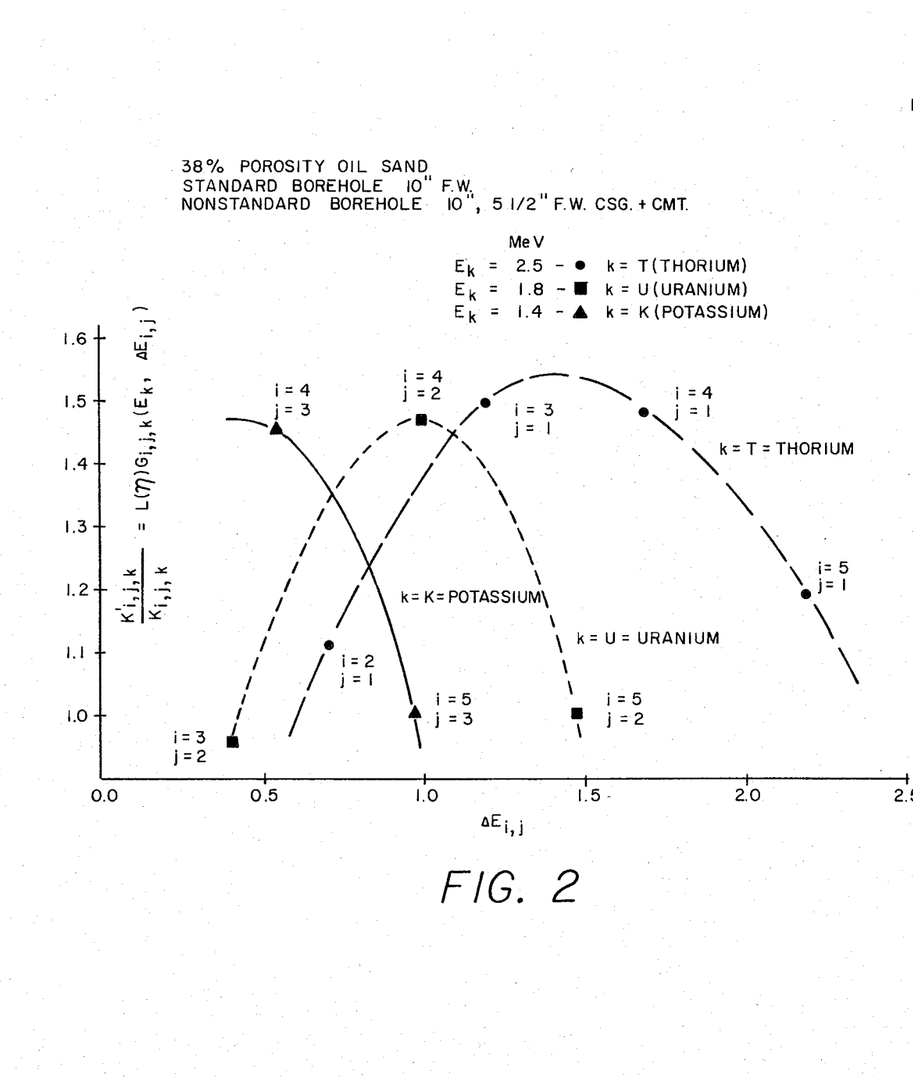
FIGS. 2 and 2A are graphical representations showing the effect of the stripping constants of borehole variation as a function of energy window placement.

Physically, the product $[L(\eta)G_{i,j,k}(E_k,\Delta E_{i,j})]K_{i,j,k}$ is simply a stripping constant for a nonstandard borehole condition, $K'_{i,j,k}$. Using the data in Table 1, the ratio $$K'_{i,j,k}/K_{i,j,k} = L(\eta)G_{i,j,k}(E_k,\Delta E_{i,j})$$

is plotted as a function of $\Delta E_{i,j}$ for k=T (thorium), k=U (uranium), and k=K (potassium) in FIG. 2.

From FIG. 2, it can be seen that the midpoint $E_k$ and widths of windows 1 through 4 were selected such that $L(\eta) G_{4,j,k}(E_k,\Delta E_{4,j})$ is essentially constant (=1.47) for all values of j and k. This is important considering the fourth window (i=4) is used as a "compensation" window to monitor the shape of the observed spectrum to thereby adjust the stripping constants for varying borehole conditions. This means that regardless of the relative concentrations of the K-U-T elements within the formation, the effects of the borehole on the stripping constant for each element will be reflected consistently in the fourth window. Mathematically, the effect can be seen as follows.

The count rate in window four, for any borehole condition is Equation (4) rewritten as:

$$C_4 = L(\eta)G_{4,1,T}(E_T,\Delta E_{4,1})K_{4,1,T} \\ C_{1,T} + L(\eta)G_{4,2,U}(E_U,\Delta E_{4,2}) \\ K_{4,2,U}C_{2,U} + L(\eta)G_{4,3,K}(E_K,\Delta E_{4,3})K_{4,3,K}C_{3,K} \tag{12}$$

where the constants $K_{4,j,k}$ are stripping constant measured in the "standard" borehole conditions surrounded by formations each of which contains only K, only U, or only Th.

But from FIG. 2, we have seen that windows have been selected such that:

$$L(\eta)G_{4,j,k}(E_k,\Delta E_{4,j}) \approx \text{Constant}.$$

for all values of j and element k for this particular nonstandard borehole. Although $L(\eta)$ will vary with changing borehole conditions, $G_{4,j,k}(E_k,\Delta E_{4,j})$ will remain constant since it is a function only of $E_k$ and $\Delta E_{4,j}$ which, of course, are fixed on defining the energy windows. We can then write equation (13) for any borehole condition as:

$$L(\eta)G_{4,j,k}(E_k, \Delta E_{4,j}) = L(\eta)\overline{G} \tag{14}$$

where $\overline{G}$ is a constant (1.47 in this instance). Substituting (14) into (12) yields $$C_4 = L(\eta)\overline{G}[K_{4,1,T}C_{1,T} + K_{4,2,U}C_{2,U} + K_{4,3,K}C_{3,K}] \tag{15}$$

Figure 2A:
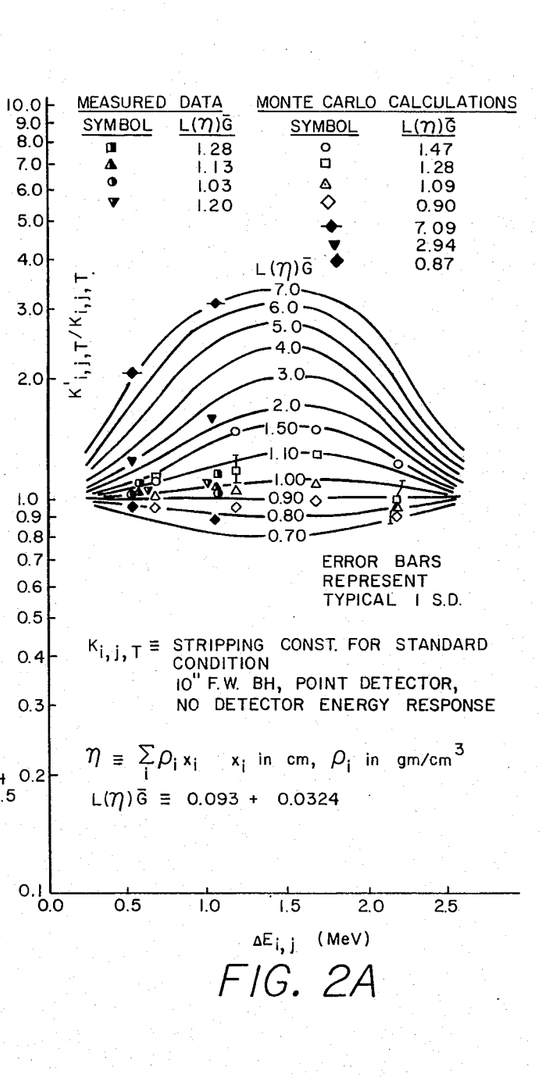

FIG. 2A shows additional ratios $K'_{i,j,T}/K_{i,j,T}$ obtained from experimental data and Monte Carlo calculations using tool, borehole, and formation parameters such that $L(\eta)\overline{G}$ varied over a suitable range from 0.87 to 7.06. These data indicate that, within the limits of statistical accuracy, the products $L(\eta)G_{i,j,k}(E_k,\Delta E_{i,j})$ can be represented by an equation of the form:

$$L(\eta)G_{i,j,k}(E_k, \Delta E_{i,j}) = 1 + F(E_k,\Delta E_{i,j})m(L(\eta)\overline{G} - 1) \tag{16}$$

where
$F(E_K,\Delta E_{i,j}) \equiv$ a function only of $E_k$ and $\Delta E_{i,j}$.

$m = a \text{ constant} = +1 \text{ if } L(\eta)\overline{G} \geq 1.0 \text{ and}$ $= -1 \text{ if } L(\eta)\overline{G} \leq 1.0$ Fitting Equation (16) to the data shown in FIG. 2A gives:
$\eta \approx 0.8$ $$F(E_T, \Delta E_{2,1}) \approx 0.22$$

$$L(\eta)G_{2,1,T}(E_T, \Delta E_{2,1}) = 1 + 0.22m(L(\eta)\overline{G} - 1)^{0.8} \text{ and}$$
$$F(E_T, \Delta E_{3,1}) = 0.50 \tag{17}$$

$$L(\eta)G_{3,1,T}(E_T, \Delta E_{2,1}) = 1.0 + 0.50m(L(\eta)\overline{G} - 1)^{0.8} \tag{18}$$

Likewise, using uranium as a source, it can be shown that:

$$F(E_U, \Delta E_{3,2}) = 0.08$$

or $$L(\eta)G_{3,2,U}(E_U, \Delta E_{3,2}) = 1.0 + 0.08mL(\eta)\overline{G} - 1)^{0.8} \tag{19}$$

Substituting Equations (17), (18), and (19) into Equations (9), (10), and (11) yields:

$$C_{1,T} = C_1 \tag{20}$$

$$C_{2,U} = C_2 - (1 + 0.22m(L(\eta)\overline{G} - 1)^{0.8})K_{2,1,T}C_1 \tag{21}$$

$$C_{3,K} = C_3 - [(1 + 0.50m(L(\eta)\overline{G} - 1)^{0.8})K_{3,1,T}C_1] - [(1 + 0.08(L(\eta)\overline{G} - 1)^{0.8})K_{3,2,U}(C_2 - (1 + 0.50(L(\eta)\overline{G} - 1)^{0.8}(K_{2,1,T}C_1)] \tag{22}$$

These three equations, along with Equation (15), now give four equations and four unknowns namely $C_{1,T}$; $C_{2,U}1$; $C_{3,K}$; and $[L(\eta)\overline{G}]$; dependent on $C_1$, $C_2$, $C_3$, and $C_4$ (which are measured) and the constants $K_{i,j,k}$ which are known calibration constants.

For borehole conditions normally encountered, $0.5 < L(\eta)\overline{G} < 1.5$. For this range of $L(\eta)\overline{G}$, the expressions for $L(\eta)G_{i,j,k}(E_k, \Delta E_{i,j})$ can be approximated, with good accuracy, by rewritting Equations (17), (18) and (19) as:

$$L(\eta)G_{2,1,T}(E_T, \Delta E_{2,1}) \doteq 1 + 0.27(L(\eta)\overline{G} - 1) \tag{17-a}$$

$$L(\eta)G_{3,1,T}(E_T, \Delta E_{3,1}) \doteq 1 + 0.57(L(\eta)\overline{G} - 1) \tag{18-a}$$

$$L(\eta)G_{3,2,U}(E_U, \Delta E_{3,2}) \doteq 1 + 0.08(L(\eta)\overline{G} - 1) \tag{19-a}$$

yielding in Equations (20), (21) and (22):
$$C_{1,T} \doteq C_1 \tag{20-a}$$

$$C_{2,U} \doteq C_2 - (1 + 0.27(L(\eta)\overline{G} - 1))K_{2,1,T}C_1 \tag{21-a}$$

$$C_{3,K} \doteq C_3 - [(1 + 0.57(L(\eta)\overline{G} - 1))K_{3,1,T}C_1] - [(1 + 0.08(L(\eta)\overline{G} - 1))K_{3,2,U}(C_2 - (1 + 0.27(L(\eta)\overline{G} - 1))K_{2,1,T}C_1)] \tag{22-a}$$

Note that in standard borehole conditions $L(\eta)G_{i,j,k} = 1$, and this is reflected in Equation (16).

Figure 3:
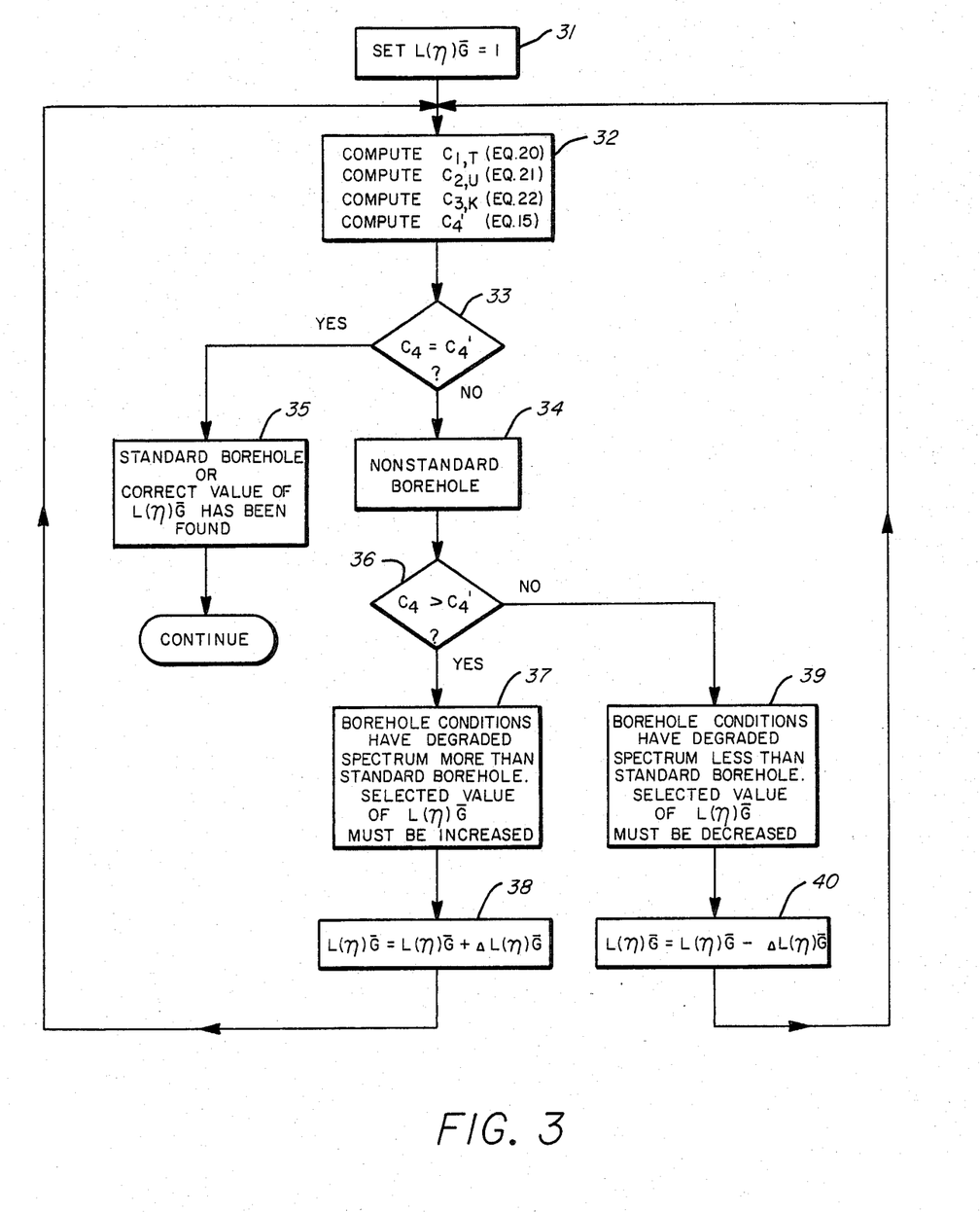
FIG. 3 is a flow chart illustrating a computer implemented method of determining a borehole compensation parameter.

The solution of the four simultaneous equations (that is, (16) to (19) inclusive) is time consuming. There is, however, an iteration technique which could also be used to obtain approximate real time solutions in logging operations. A flow chart or logic flow of the solution is shown in FIG. 3. Of course, with a computer with sufficient speed, the analytical solution can be used rather than the iterative approach described hereinafter.

Upon entry into the iteration technique scheme at logic block 31, the function $L(\eta)\overline{G}$ is set initially equal to 1.0 as a first guess (i.e. a value corresponding to standard borehole conditions). Control is then transferred to logic block 32 where computations of $C_{1,T}$, $C_{2,U}$ and $C_{3,K}$ are made using Equations (20), (21), and (22) respectively. Substituting these variables, together with the assumed value of $L(\eta)\overline{G}$ into Equation (15) results in a calculation of the expected count rate $C_4'$ obtained from window 4 ($C_4'$ replaces $C_4$ in the equation to denote a calculated rather than a measured value). Control is then transferred to logic block 33 where a comparison test is made to determine if the computed $C_4'$ is about equal to the observed fourth window count rate $C_4$. If $C_4$ and $C_4'$ are within some preselected value $\Delta C_4$ of each other, then the iteration scheme is complete and control is transferred to logic block 35 where the correct value of $L(\eta)\overline{G}$ is output. If the test at block 33 does not pass, then non-standard borehole conditions are being encountered as indicated at logic block 36 where a second test to determine if $C_4 > C_4'$. If $C_4 > C_4'$ then control is transferred to block 37 where (at block 38) the function $L(\eta)\overline{G}$ is increased. If $C_4$ $C_4'$ then control is transferred to logic blocks 39 and 40 where the function $L(\eta)\overline{G}$ is decreased. Exit from either logic block 38 or 40 is to loop back to block 32 where another iteration is begun with the updated value of the function $L(\eta)\overline{G}$. In this manner, the function $L(\eta)\overline{G}$, for the particular borehole conditions being encountered may be determined.

The rate at which the solution converges can be seen with the following exemplary well:

| | |
|---|---|
| $C_1 = 1.7$ | These observed count rates are in |
| $C_2 = 1.14$ | arbitrary units but the relative |
| $C_3 = 2.87$ | elemental proportions are typical of |
| $C_4 = 3.80$ | those observed in an average |
| | kaolinite having 13 ppm of Th, 2 ppm |
| | of U, and 0.42% K; | setting $L(\eta)\overline{G} = 1.0$ for a standard 10" open borehole filled with fresh water for which stripping constants are:

| | |
|---|---|
| $K_{2,1,T} = 0.118$ | $K_{4,1,T} = 0.357$ |
| $K_{3,1,T} = 0.157$ | $K_{4,2,U} = 0.647$ |
| $K_{3,2,U} = 0.406$ | $K_{4,3,K} = 0.657$ |

| $L(\eta)\overline{G}$ | $C_{1,T}$ | $C_{2,U}$ | $C_{3,K}$ | $C_4'$ | $C_4$ |
|---|---|---|---|---|---|
| 1.00 | 1.7 | 0.939 | 2.222 | 2.674 | 3.80 |
| 1.10 | 1.7 | 0.934 | 2.197 | 2.921 | 3.80 |
| 1.20 | 1.7 | 0.928 | 2.171 | 3.160 | 3.80 |
| 1.30 | 1.7 | 0.923 | 2.146 | 3.398 | 3.80 |
| 1.40 | 1.7 | 0.918 | 2.122 | 3.633 | 3.80 |
| 1.50 | 1.7 | 0.912 | 2.096 | 3.832 | 3.80 |

Therefore, $L(\eta)\overline{G} = 1.47$ as the iterations converge.

In many applications, iteration on each subsequent data set may conveniently begin in block 31 assuming as an initial value the $L(\eta)\overline{G}$ obtained as a result of convergence on prior data set(s). In intervals of constant or slowly changing borehole conditions, this will result in more rapid convergence than if standard conditions were initially assumed.

CONVERSION OF $C_{1,T}$ and $C_{2,U}$ and $C_{3,K}$ TO ELEMENTAL CONCENTRATIONS The stripped count rates $C_{i,k}$ are converted to the corresponding elemental concentrations $M_k$ using the relationship:

$$M_k = C_{i,k}/B(\eta)Q_k \tag{23}$$

where $Q_k$ (k=T,U,K)=calibration constants measured with the tool in a standard borehole surrounded by one of three formations containing known concentrations of only Th, only U, or only K;

$B(\eta)$=a term which normalizes the calibration constants $Q_k$, which were measured using standard borehole conditions, to borehole which are non-standard.

Monte Carlo calculations have shown that, to a good approximation, $\eta$ can be computed from $L(\eta)\overline{G}$ (which is obtained in the previously described iteration process) using the equation:

$$\eta = (L(\eta)\overline{G} - 0.093)/0.0324 \tag{24}$$

Note that the standard borehole $L(\eta)\overline{G}=1$ and $\eta=28$. Also, Monte Carlo calculations show that the function form of $B(\eta)$ can be approximated by:

$$B(\eta) = 6.91 \exp(-0.01\eta + 0.001\eta^2) \tag{25}$$

To summarize, $M_k$ is computed from the corresponding stripped count rate $C_{i,k}$ as follows:
 (a) $L(\eta)\overline{G}$ is obtained from the previously described iteration technique or direct solution of the set of four equations;
 (b) $\eta$ is computed from Equation (24) using $L(\eta)\overline{G}$;
 (c) $B(\eta)$ is computed from Equation (25) using $\eta$; and
 (d) $M_k$ is computed from Equation (23) using $B(\eta)$ and the appropriate stripped count rate $C_{i,k}$.

The improvement in accuracy of the resulting $M_k$ values in non-standard boreholes can be demonstrated by again using hypothetical Monte Carlo data computed in a standard and non-standard borehole.

For a (non-standard) 10" borehole containing a 5½" fresh water filled casing and a cement annulus, the borehole compensated striped count rates are:

$$C_{1,T}=1.7 \quad C_{2,U}=0.92 \quad C_{3,K}=2.11 \tag{26}$$

with an iterated value of $L(\eta)\overline{G}=1.47$. Using Equation (24), one obtains $$\eta=42.5 \tag{27}$$

Using Equation (25) and the result of (27) yields:

$$B(\eta)=0.599 \tag{28}$$

For the purposes of this hypothetical demonstration, assume:

$$Q_k=1 \text{ for } K=T, U, \text{ and } K \tag{29}$$

Substituting the values from Equations (29), (28) and (26) into Equation (23) yields:

$$M_T=2.83 \quad M_U=1.54 \quad M_K=3.52 \tag{30}$$

Monte Carlo calculations using the standard borehole geometry with identical elemental concentrations yielded values of:

$$M_T=2.80 \quad M_u=1.52 \quad M_k=3.65 \tag{30}$$

thereby indicating good agreement.

APPLICATION OF BOREHOLE COMPENSATION TECHNIQUE TO GAMMA RAY SPECTRA ANALYZED BY THE METHOD OF LEAST SQUARES FITTING

Assuming standard borehole conditions, $N_i$, the total number of gamma ray counts in energy channel i having a midpoint in gamma radiation energy band $E_i$, is given by:

$$N_i = \Sigma_k W_k N_{i,k} \tag{32}$$

where $N_{i,k}$=number of gamma ray counts in energy channel i from the spectrum of element k, measured in standard borehole conditions (the "library" spectrum):

$W_k$=a term proportional to the concentration of element k within the formation.

The terms of interest $W_k$ (related to the elemental concentrations) are determined using the least square criterion:

$$\sum_i (\overline{N}_i - N_i)^2 = \text{MINIMUM VALUE} \tag{33}$$

where $\overline{N}_i$=the number of gamma ray counts observed in energy channel i.

When non-standard borehole conditions are encountered, the standard or "library" spectra counts $N_{i,k}$ must be modified by $$N'_{i,k} = L(\eta)G(E_i)N_{i,k} \tag{34}$$

where $N'_{i,k}$=the library spectra counts in channel i from element k for non-standard borehole conditions;

$G(E_i)$=a term which is a function of the gamma ray energy $E_i$ recorded in the mid-point of energy channel i. Again, using the least-square criterion:

$$\Sigma_i(\overline{N}_i - N_i')^2 = \text{MINIMUM VALUE} \tag{35}$$

where $$N_i' = \Sigma_k W_k N'_{i,k} \tag{36}$$

The terms $G(E_i)$ can be computed or measured. Therefore, the set of equations generated by the least squared criterion can be solved for $W_k$ and $L(\eta)$.

Elemental concentrations, $M_k$, are then computed from:

$$M_k = W_k/B(\eta)Q_k' \tag{37}$$

where $Q_k'$=calibration constants measured with the tool in a standard borehole surrounded by one of three formations containing known concentrations only Th, only U, or only K.

For Equation (37), $B(\eta)$ and $\eta$ are given by Equations (25) and (24), respectively.

ISOLATION OF THE FORMATION DENSITY

It has been shown above how the borehole compensated spectral analysis technique may be used to derived the four parameters, $M_T$, $M_u$, $M_k$ and $\eta$. The parameter $\eta$ may be regarded as an attenuation coefficient related to the attenuation of gamma rays between their point of origin in the earth formations surrounding the well bore and their measurement point in the detector. The attenuation coefficient $\eta$ may be thought of as having a borehole component and a formation component term as given in equation 37a $$\eta = \sum_j \rho_j x_j + \rho_F X_F \tag{37a}$$

where $$\sum_j$$

$\rho_j x_j$ is the summation of borehole terms relating to each intervening radial layer having density $\rho_j$ and thickness $x_j$. The term $\rho_F X_F$ is the formation term, where $\rho_F$ is the formation density and $X_F$ is the average distance gammas must travel through the formation prior to being detected in the borehole.

This may be further broken down as follows:

Each gamma ray photon arriving at the scintillation detector must travel radially through several materials to arrive at the detector. The intensity of the photon is attenuated in more detail in a manner given by Equation (38).

$$\eta = \rho_w x_w + \rho_{Fe} x_{Fe} + \rho cmt x_{cmt} + \rho_F x_F \tag{38}$$

where the subscripts w refers to borehold fluid, Fe the casing, cmt the cement and F the formation material.

$\rho$ = density of material;

x = distance of material through which the photon must pass to reach the detector The first of the several attenuation terms in Equation (38) is attributable to the well fluid. This normally is known. For instance, it may be fresh water, salt water drilling mud and the like. Both factors in this term are usually known. Typically, this term can be reduced to a single entry for a particular wellbore because the fluid does not change; also, the distance of photon travel through the material does not change, except in uncased boreholes. In uncased holes, a caliper measurement can be used to estimate $X_w$.

The second term, in Equation (38), is the attenuation attributable to the casing. Again, this is usually known and does not change appreciably in a particular wellbore. The thickness and density of the casing, being known, yields a constant term for the wellbore, or at least for those portions thereof where the casing program is known in advance. Accordingly, this term can ordinarily be reduced to a constant for a particular wellbore.

The third term in Equation (38) is the attenuation attributable to the cement around the casing in the annular space. Ordinarily, the cement is relatively consistent in thickness in the annular space around the casing. The density of the cement is reasonably uniform and accordingly, this term also reduces to a fairly constant number for a particular wellbore. If open hole caliper data is available variations in cement thickness can be taken into account.

This reduces Equation (38) to the formation term. This simplification can be obtained in most instances. For instance, in open holes, a caliper tool run with the borehole gamma ray measuring apparatus can determine the dimensions of the borehole. In open holes, the fluid is usually drilling mud which is measured at the surface. It is possible, therefore, to reduce Equation (38), in most instances, to the formation term because the first three terms of equation (38) are relatively constant, sometimes so small that they may be ignored, or both constant and small.

It is possible to approximate that the distance for travel of the gamma ray photon in the formation is similar for all formations. That is, the statistically determined average distance of travel, B, for a particular gamma ray photo from the formation in reaching the detector is approximately independent of the type of formation. The above described assumptions lead to rewriting Equation (38) (now simplified) to a form given by Equation (39) where A and B are constants:

$$\eta = A + B\rho_F \tag{39}$$

The form of Equation (39) is relatively simple once the constants A and B are determined. The latter factor can be determined by calibration with known or standard formations. Equation (39) is then solved to isolate the density factor whereupon formation density is then determined.

A more refined determination of formation effective travel thickness for gamma rays, which makes use of the different energy distributions from each source element, is given by Equation (40):

$$X_F = F_1(M_k, M_u, M_T) \tag{40}$$

where $F_1$ is a predetermined function.

It will be recalled that the concentration variables in Equation (40) were determined earlier, namely at Equation (37). The K-U-T elemental concentrations are first determined, and the effect of each elemental concentration is isolated and evaluated for Equation (40). Test pit data or computer simulations, using Monte Carlo techniques, can be used to determine the functional form of $F_1$. This procedure enables evaluation of Equation (40) to obtain $X_F$ which is thereafter used in Equation (38) to isolate formation density.

Figure 4:
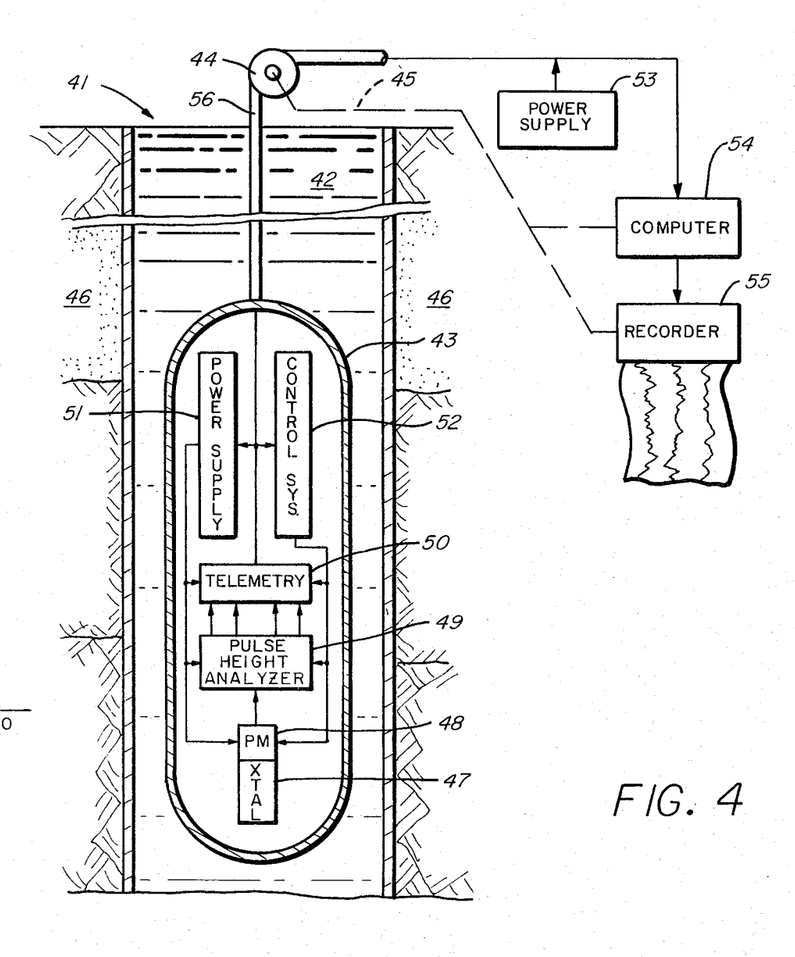
FIG. 4 is a schematic diagram of the well logging system employing the concepts of the present invention.
Figure 5:
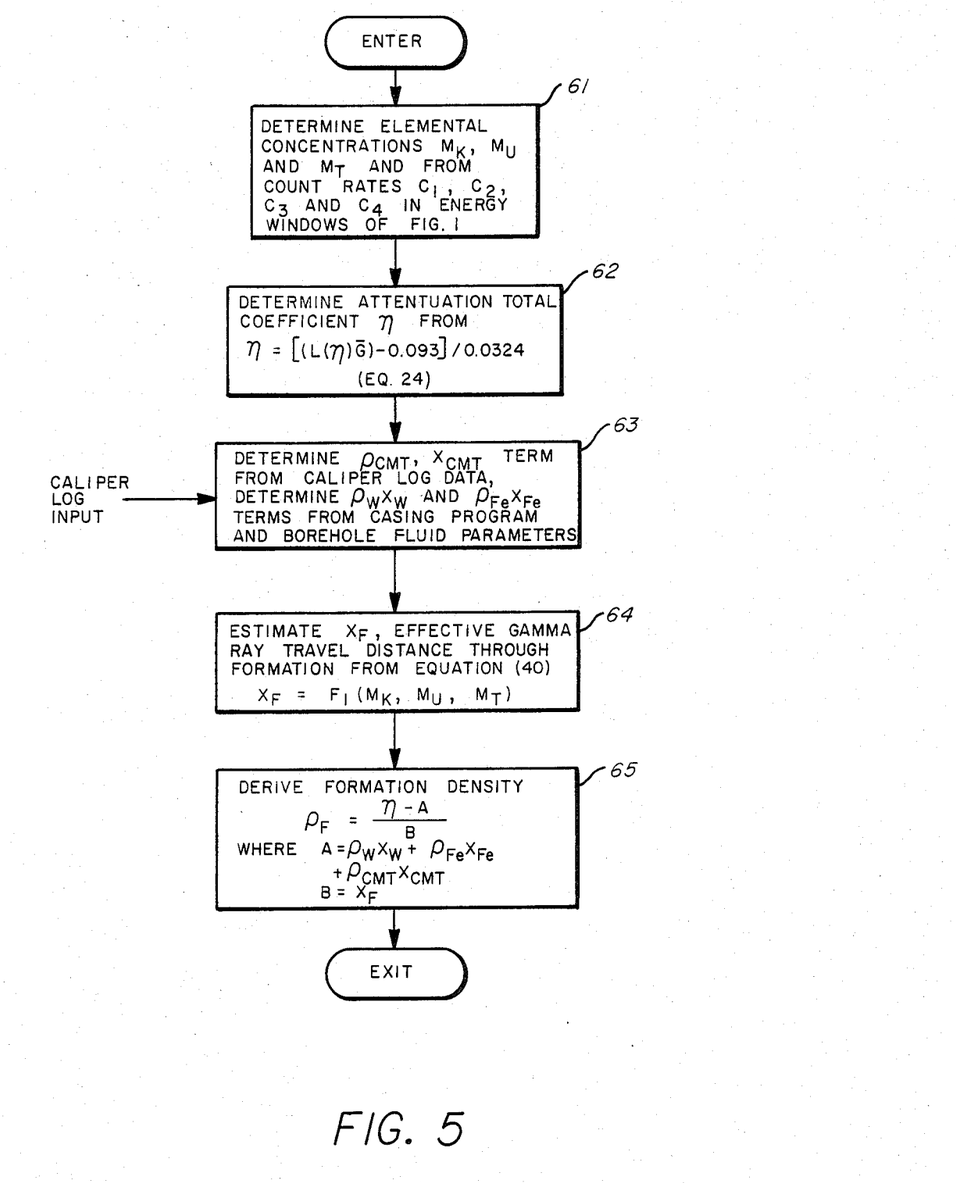
FIG. 5 is a flow chart illustrating the manner of determining formation density.

A procedure is shown in flow chart form in FIG. 5 for use in surface computer 54 of FIG. 4 for determining the formation density $\rho_F$ in this manner. Upon entry control is passed to logic block 61 where the hereinbefore described techniques are used to determine the formation elemental concentrations of uranium, potassium and thorium from the count rates $C_1$, $C_2$, $C_3$ and $C_4$ in energy windows 1-4 of FIG. 1. Control then passes to logic block 62 where the total attenuation coefficient $\eta$ is determined using the technique of equation 24.

Control then passes to logic block 63 where the relatively constant components of the total attenuation coefficient $\eta$ are determined from caliper log data stored in the memory of surface computer 54 and from the casing program and borehole fluid parameters which were previously known and stored in memory.

At logic block 64 the effective travel distance of gamma rays from the formation source to detector $X_F$ is determined based on the elemental concentrations $M_k$, $M_u$, and $M_T$ derived in block 61. Finally, at block 65 the formation density $\rho_F$ is determined as shown therein. Control is then returned to the operating system of surface computer 54 for further processing of measurement data at different depths in the well borehole.

WELL LOGGING SYSTEM

Referring now to FIG. 4, a well logging system in accordance with the concepts of the present invention is illustrated schematically. A well borehole 41 penetrates earth formation 46 and is lined with a steel casing. It will be understood that the invention can also be used in open hole if desired. The borehole 41 contains a well bore fluid 42 to control pressure in subsurface formations. Suspended in the borehole 41 by an armored well logging cable 56 or sonde 43 containing instrumentation for measuring gamma ray spectral characteristics of the earth formations 46 penetrated by the borehole 41. Signals from the downhole sonde 43 conducted to the surface on conductors of the cable 56 and supplied to a surface computer 54 which performs the hereinbefore described signal processing techniques in order to extract the elemental constituents of potassium, uranium and thorium present in the earth formations 46 which are then recorded as a function of borehole depth on the recorder 55. The well logging cable 56 passes over a sheave wheel 44 which is electrically or mechanically coupled (as indicated by a dotted line 45) to the computer 54 and recorder 55 in order to provide depth information about the downhole sonde 43 for the surface recording process. The surface computer 54 may be a model PDP-11 provided by Digital Equipment Corp. of Cambridge, Mass. and can be programmed in a high level language such as FORTRAN to perform the previously described computations and to drive the output displays.

The downhole sonde 43 contains, near the lower end thereof, a gamma ray detecting system comprising a scintillation crystal 47 and a photomultiplier and amplifier package 48. Power for the operation of the downhole sonde system is supplied from a surface power supply 53 via conductors of the cable 56 to a downhole power supply 51 where it is converted to appropriate voltage levels and supplied to the downhole circuitry components of the system as indicated in FIG. 4. Gamma ray spectral signals are supplied from the photomultiplier tube 48 to a pulse height analyzer 49 where they are separated into count rates in the six energy windows hereinbefore described. The pulse height analyzer provides the six output signals corresponding to the count rates in each of the energy windows herein described to a telemetry system 50 where the pulse height gamma ray spectral information is converted to an appropriate wave form for transmission to the surface via conductors of the well logging cable 56. Downhole control circuits 52 provide timing pulses to the pulse height analyzer and telemetry system in order to synchronize the transmission at regular data intervals from the downhole sonde 43 to the surface equipment. These synchronization signals are also encoded in the telemetry system 50 and supplied to the surface computer 54.

Thus, naturally occurring gamma rays from the earth's formations 46 are detected by the scintillation crystal 47, photomultiplier 48 detector system in the downhole sonde 43, broken down into their energy constituents by the pulse height analyzer 49 and telemetered to the surface by the telemetry system 50 on conductors of the armored well logging cable 56. At the surface, the signals are processed in accordance with the hereinbefore described techniques in order to extract the radioactive elemental constituency of earth's formations 46 penetrated by the borehole 41 to obtain formation density.

The foregoing description may make other alternative arrangements according to the concepts of the present invention apparent to those skilled in the art.

I claim:

1. A method of natural gamma ray spectral logging of earth formations in the vicinity of a fluid filled well borehole to determine formation density, comprising the steps of:

obtaining, with a borehole measurement system, an unknown gamma ray energy spectrum in a measurement borehole having unknown and possibly non-standard borehole conditions, said unknown gamma ray energy spectrum comprising gamma ray intensities measured in at least four energy bands, three of said energy bands corresponding to decay peaks of potassium, uranium and thorium unstable radioactive isotopes, said fourth energy band being selected to monitor changes in the shape of said gamma ray energy spectrum due to borehole and formation conditions;

deriving from said unknown gamma ray energy spectrum by comparing said unknown spectrum with standard gamma ray spectra for unstable isotopes of potassium, uranium and thorium taken in standard boreholes, a measure of the total attenuation coefficient $\eta$ for measured natural gamma rays occurring in earth formations in the vicinity of the measurement borehole;

determining as a function of said measure of the attenuation coefficient $\eta$ and predetermined measures of the wellbore fluid, casing program for the wellbore and properties of the cement between the casing and the wellbore, an indication of the density of the earth formations in the vicinity of the well bore; and repeating the previous steps at a plurality of depths in the borehole and recording said indications of density of the formations as a function of borehole depth, thereby to provide a well log of the formation density as a function of borehole depth.

2. The method of claim 1 wherein the step of determining the indication of formation density is performed according to a function relationship between formation density $\rho_F$ and total attenuation coefficient $\eta$ of the form $$\eta = \rho_W X_W + \rho_{FE} X_{FE} + \rho_{CMT} X_{CMT} + \rho_F X_F$$

where $\rho_W$, $\rho_{FE}$ and $\rho_{CMT}$ represent previously known densities of borehole fluid, iron casing and cement layers respectively and $X_W$, $X_{FE}$, $X_{CMT}$ and $X_F$ represent effective predetermined thicknesses of borehole fluid, iron casing, cement layer and formation travel length of gamma ray photons.

3. The method of claim 2 wherein $X_{CMT}$ is determined independently by a prior wellbore caliper log.

4. The method of claim 2 wherein the effective travel path thickness $X_F$ for gamma ray photon in the formation material is obtained from a predetermined functional relationship $F_1$ of the form $$X_F = F_1(M_K, M_u, M_T)$$

where $M_K$, $M_u$ and $M_T$ are elemental concentrations of potassium, uranium and thorium in the earth formations.

5. The method of claim 4 wherein the elemental concentrations $M_K$, $M_u$ and $M_T$ are compensated for borehole variations by use of the gamma ray count rates in said fourth energy band.

6. The method of claim 1 wherein the step of determining the indication of formation density is performed according to a functional relationship between formation density $\rho_F$ and total attenuation coefficient $\eta$ of the form $$\eta = A + B\rho_F$$

where A and B are predetermined constants related to the density and effective travel path thickness for gamma ray photon of materials in the well borehole and its surrounding environment.

7. The method of claim 1 wherein the step of obtaining an unknown gamma ray energy spectrum is performed with a borehole measurement system employing a low atomic number $z$ tool housing surrounding a scintillation type gamma ray detector, thereby preventing undue attenuation of low energy gamma rays by said tool housing.

* * * * *